(12) United States Patent
Baines et al.

(10) Patent No.: US 12,301,606 B1
(45) Date of Patent: May 13, 2025

(54) VULNERABILITY DETECTION PLATFORM

(71) Applicant: VulnCheck Inc., Lexington, MA (US)

(72) Inventors: Jacob Robert Baines, Hatfield, PA (US); Michael Aaron King, Owens Cross Roads, AL (US); Anthony John Bettini, Lexington, MA (US)

(73) Assignee: VulnCheck Inc., Lexington, MA (US)

( * ) Notice: Subject to any disclaimer, the term of this patent is extended or adjusted under 35 U.S.C. 154(b) by 0 days.

(21) Appl. No.: 18/665,845

(22) Filed: May 16, 2024

Related U.S. Application Data

(60) Provisional application No. 63/647,534, filed on May 14, 2024.

(51) Int. Cl.
*H04L 9/40* (2022.01)

(52) U.S. Cl.
CPC .............................. *H04L 63/1425* (2013.01)

(58) Field of Classification Search
CPC . H04L 63/1425; H04L 63/14; H04L 63/1433; H04L 63/145; H04L 2463/144
See application file for complete search history.

(56) References Cited

U.S. PATENT DOCUMENTS

| | | | | |
|---|---|---|---|---|
| 10,516,694 | B1* | 12/2019 | Gupta | H04L 63/1416 |
| 2020/0067970 | A1* | 2/2020 | Compton | H04L 45/32 |
| 2020/0267120 | A1* | 8/2020 | Arnoth | H04L 12/66 |
| 2021/0392145 | A1* | 12/2021 | Shinomiya | G06F 21/564 |
| 2022/0053023 | A1* | 2/2022 | Althouse | H04L 9/0643 |
| 2022/0263799 | A1* | 8/2022 | Kaidi | H04L 63/0236 |
| 2022/0385673 | A1* | 12/2022 | Dong | G06N 20/00 |
| 2023/0011588 | A1* | 1/2023 | Parry | G06F 16/24573 |
| 2023/0071606 | A1* | 3/2023 | Kesavan | G06F 11/3409 |
| 2024/0205128 | A1* | 6/2024 | Floyd, III | H04L 43/0817 |

OTHER PUBLICATIONS

Kusumarini et al., "Information System Security Analysis to Determine Server Security Vulnerability with Penetration Testing Execution Standard (PTES) Method at VWX University," 2021 International Conference on Informatics, Multimedia, Cyber and Information System (ICIMCIS Year: 2021 | Conference Paper | IEEE.*
Koutras et al., "Automating environmental vulnerability analysis for network services," 2022 IEEE Symposium on Computers and Communications (ISCC) Year: 2022 | Conference Paper | Publisher: IEEE.*

* cited by examiner

*Primary Examiner* — Roderick Tolentino
(74) *Attorney, Agent, or Firm* — Van Pelt, Yi & James LLP

(57) ABSTRACT

Embodiments of a vulnerability detection platform and various examples of its uses are disclosed. A set of attack servers associated with malicious activity is received. A set of potentially vulnerable target servers is also received. A determination of an association between at least one attack server included in the set and one potentially vulnerable target server included in the set is made. An action is performed, at least in part, based on the determined association.

41 Claims, 15 Drawing Sheets

```
{
    "name": "BlueShell",                                                          ⎤
    "type": "C2",                                                                 |
    "availability": "open-source",                                                ⎬—202
    "reference": "https://github.com/restran/BlueShell",                          |
    "shodanQueries": [                                                            ⎦
        "https://www.shodan.io/search?query=ssl%3A%22CN%3Dblueshell.com%22+ssl%3A%22O%3DBlueOrg%22"
    ],
    "censysQueries": [                                                                                                                                                      ⎤
        "https://search.censys.io/search?resource=hosts&sort=RELEVANCE&per_page=25&virtual_hosts=                                                                            |
INCLUDE&q=same_service%28services.tls.certificates.leaf_data.issuer.common_name                                                                                             ⎬—204
%3D%22blueshell.com%22+and+services.tls.certificates.leaf_data.issuer.organization%3D%22BlueOrg%22%29"                                                                       |
    ]                                                                                                                                                                       ⎦
},
...,
{
    "name": "Metasploit",
    "type": "C2",
    "availability": "commercial",
    "reference": "https://www.rapid7.com/products/metasploit/",
    "shodanQueries": [
        "https://www.shodan.io/search?query=ssl%3A%22MetasploitSelfSignedCA%22",
        "https://www.shodan.io/search?query=html%3A%27%3Cmeta+name%3D%22application-name%22+content
%3D%22Metasploit%22+%2F%3E%27"
    ],
    "censysQueries": [
        "https://search.censys.io/search?resource=hosts&sort=RELEVANCE&per_page=25&virtual_hosts=
INCLUDE&q=services.tls.certificate.parsed.issuer.common_name%3D%22MetasploitSelfSignedCA%22",
        "https://search.censys.io/search?resource=hosts&sort=RELEVANCE&per_page=25&
virtual_hosts=INCLUDE&q=services.http.response.body%3A%27%3Cmeta+name%3D%22application-
name%22+content%3D%22Metasploit%22+%2F%3E%27"
    ]
}
```

FIG. 2A

```
{
    "name": "CVE-2016-5195 Exploits",
    "type": "open directory",
    "availability": "open source",
    "reference": "https://dirtycow.ninja/",
    "googleQueries": [
        "intitle%3A%22Index%20of%22%20%22Last%20modified%22%20%22dirtyc0w%20%22dirtyc0w32%20OR%20dirtyc0w64%20OR%20dirty.c%22"
    ]
}
```

FIG. 2B

```
{
    "name": "c99",
    "type": "webshell",
    "availability": "open source",
    "reference": "https://github.com/tennc/webshell/blob/master/php/PHPshell/c99/c99.php",
    "googleQueries": [
        "intitle%3A%22c99shell%22%20AND%20%22Self%20remove%22%20AND%20-%22%24_REQUEST%22%20AND%20ext%3Aphp",
        "intitle%3A%22phpshell%22%20AND%20%22Self%20remove%22%20AND%20-%22%24_REQUEST%22%20AND%20ext%3Aphp",
        "%22Self%20remove%22%20AND%20%22c99%22%20AND%20%22Eval%20PHP%20code%22%20AND%20ext%3Aphp",
        "%22%24_REQUEST%22%20AND%20%22c99%22%20AND%20%22Eval%20PHP%20code%22%20AND%20ext%3Aphp"
    ]
},
{
    "name": "Gecko",
    "type": "webshell",
    "availability": "open source",
    "reference": "https://github.com/MadExploits/Gecko/tree/main",
    "googleQueries": [
        "inurl%3A%22gecko%22%20AND%20%22Server%20IP%22%20AND%20%22Upload%22%20AND%20ext%3Aphp",
        "inurl%3A%22gecko%22%20AND%20%22Backdoor%20Destroyer%22%20AND%20ext%3Aphp"
    ]
}
```

FIG. 2C

```
{
    "cve": "CVE-2019-1652",
    "artifacts": [
        {
            "vendor": "Cisco",
            "product": [
                "RV320",
                "RV325"
            ],
            "dateAdded": "2022-09-23",
            "artifactName": "Cisco RV Series Certificate Command Injection",
            "exploit": true,
            "versionScanner": false,
            "pcap": true,
            "suricataRule": true,
            "snortRule": true,
            "yara": false,
            "shodanQueries": [
                "https://www.shodan.io/search?query=title%3A%22Router%22+html%3A%22%2Fimages%2Fcisco.png%22"
            ],
            "censysQueries": [
                "https://search.censys.io/search?resource=hosts&sort=RELEVANCE&per_page=25&virtual_hosts=EXCLUDE&q=services.http.response.body%3A%22%2Fimages%2Fcisco.png%22+and+services.http.response.html_title%3A%22Router%22"
            ]
        }
    ]
}
```

FIG. 3

```
{
  "ip": "45.63.56.203",
  "port": 443,
  "ssl": true,
  "lastSeen": "2024-04-01-22T04:54:40Z",
  "asn": "AS30473",
  "country": "United States",
  "city": "Santa Clara",
  "cve": [],
  "matches": [
    "C2: Metasploit"
  ],
  "hostnames": [
    "45.63.56.203.uberfuncontent.com"
  ]
}
```
— 410

FIG. 4A

```
{
  "ip": "185.165.116.128",
  "port": 443,
  "ssl": true,
  "uri": "https://web.mycopclubs.com/c99.php",        — 402
  "lastSeen": "2024-04-16T12:41:04.664754",           — 408
  "cve": [],
  "matches": [
    "webshell c99"                      — 404
  ],
  "hostnames": [
    "web.mycopclubs.com"                — 406
  ]
}
```

FIG. 4B

```
{"start_time":"2024-03-25 23:58:26", "src_ip_addr":"34.144.84.151",
"src_cc":"US", "dst_ip_addr":"139.138.255.141", "dst_cc":"TH", "proto":6,
"src_port":49304, "dst_port":9981, "tcp_flags":2, "num_pkts":9362,
"num_octets":561720, "sample_algo":null, "sample_interval":null,
"client_ip_addr":"34.144.84.151", "client_cc":"US",
"server_ip_addr":"139.138.255.141", "server_cc":"TH", "client_port":49304,
"server_port":9981, "src_ip_categories":"scanner.ssh-scanner, vpn.ipsec",
"dst_ip_categories":"cdn.akamai,router.netgear,router.tp-link,vpn.pptp",
"query_type":"flows"}
```

FIG. 5A

```
{
  "src_ip_addr": "34.144.84.151",
  "dst_ip_addr": "139.138.255.141",
  "proto": 6,
  "src_port": 49304,
  "dst_port": 9981,
  "num_pkts": 9362,
  "client_ip_addr": "34.144.84.151",
  "server_ip_addr": "139.138.255.141",
  "client_port": 49304,
  "server_port": 9981,
  "src_ip_categories": "scanner.ssh-scanner,vpn.ipsec",
  "dst_ip_categories": "cdn.akamai,router.netgear,router.tp-link,vpn.pptp",
}
```

```
{
  "_id": "4Gqhs4oBawBfpNEN_Ak9",
  "_index": "ipintel.2024-04-10",
  "_source": {
    "asn": "AS16625",
    "city": "San Francisco",
    "country": "United States",
    "cve": [],
    "hostnames": [],
    "ip": "142.32.248.165",
    "lastSeen": "2024-04-08T19:29:59.942539",
    "matches": [],
    "port": 31337,
    "ssl": true,
    "type": {
      "finding": "command and control infrastructure",
      "id": "c2",
      "source": "command and control feed"
    },
    "type_meta": {
      "toolkits": [
        {
          "availability": "open-source",
          "name": "Meterpreter",
          "reference": "https://github.com/rapid7/metasploit-framework"
        }
      ]
    }
  }
}
```

```
{
  "_id": "LpzHtYoB8XiDJLVYiotW",
  "_index": "ipintel.2024-04-10",
    "asn": "AS38229",
    "city": "Colombo",
    "country": "Sri Lanka",                    ⎫
    "cve": [                                   ⎬ 702
      "CVE-2023-23752"                         ⎭
    ],
    "hostnames": [
      "k0rnn.ac.lk"
      "k1rnn.ac.lk"
      "k2rnn.ac.lk"
    ],
    "ip": "195.248.24.75",
    "lastSeen": "2024-09-20T09:54:45.139556",
    "matches": [
      "Joomla Users and mysql credential leak"  ⎯ 704
    ],
    "port": 443,
    "ssl": true,
    "type": {                                   ⎫
      "finding": "potentially vulnerable",      ⎪
      "id": "ia",                               ⎬ 706
      "source": "initial access feed"           ⎪
    }                                           ⎭
  }
},
```

FIG. 7

```
{
  "57.250.37.136": {                    ⎧—802
    "c2": [
      {
        "c2IP": "57.250.37.136",
        "c2Port": 4949,
        "c2Product": "Spynote",
        "country": "Malaysia"
      }
    ],
    "colocated": [
      {
        "iaIP": "57.250.37.136",
        "iaPort": 9530,
        "iaProduct": "Potentially Vulnerable: Xiongmai OpenTelnet Backdoor",
        "iaVulns": [
          "CVE-2020-22253"
        ],
        "country": "Malaysia"
      }
    ],
    "c2ConnectToIA": [],
    "iaConnectToC2": [],
    "c2ConnectToUnknownServer": [],
    "unknownClientConnectToC2": [],
    "c2ConnectToc2": []
  }
}
```

FIG. 8

```
{
  "124.207.20.16": {         ⟵ 902
    "c2": [
      {
        "c2IP": "124.207.20.16",
        "c2Port": 80,
        "c2Product": "Cobalt Strike",
        "country": "China"
      },
      {                                              ⎫
        "c2IP": "124.207.20.16",                     ⎬ 904
        "c2Port": 5555,                              ⎭
        "c2Product": "Cobalt Strike",
        "country": "China"
      }
    ],
    "colocated": [],
    "c2ConnectToIA": [],
    "iaConnectToC2": [],
    "c2ConnectToUnknownServer": [],
    "unknownClientConnectToC2": [
      {
        "iaIP": "34.199.95.40",
        "iaPort": 0,
        "iaProduct": "unknown",
        "iaVulns": [],
        "country": "US"
      },
      {
        "iaIP": "156.190.22.11",
        "iaPort": 0,
        "iaProduct": "unknown",
        "iaVulns": [],
        "country": "US"
      }
    ],
    "c2ConnectToc2": [
      {                                              ⎫
        "iaIP": "207.174.180.233",                   ⎬ 906
        "iaPort": 443,                               ⎭
        "iaProduct": "c2",
        "iaVulns": [],
        "country": "NL"
      }
    ]
  }
}
```

FIG. 9

```
{
  "129.199.36.184": {
    "c2": [
      {
        "c2IP": "129.199.36.184",
        "c2Port": 3790,
        "c2Product": "Metasploit",
        "country": "Netherlands"
      }
    ],
    "colocated": [],
    "c2ConnectToIA": [
      {
        "iaIP": "123.168.50.18",
        "iaPort": 443,
        "iaProduct": "Potentially Vulnerable: Grafana Database Exfiltrate",
        "iaVulns": [
          "CVE-2021-43798"
        ],
        "country": "Viet Nam"
      },
      {
        "iaIP": "15.99.148.134",
        "iaPort": 443,
        "iaProduct": "Potentially Vulnerable: Cisco Cookie Field Auth Bypass",
        "iaVulns": [
          "CVE-2022-20705",
          "CVE-2022-20707",
          "CVE-2022-20708",
          "CVE-2022-20709",
          "CVE-2022-20712"
        ],
        "country": "India"
      },
      ...
      {
        "iaIP": "128.97.74.34",
        "iaPort": 443,
        "iaProduct": "Potentially Vulnerable: Zimbra Webshell via Zip Upload",
        "iaVulns": [
          "CVE-2022-27925"
        ],
        "country": "Indonesia"
      }
    ],
    "iaConnectToC2": [],
    "c2ConnectToUnknownServer": [],
    "unknownClientConnectToC2": [],
    "c2ConnectToc2": []
  }
}
```

1002 — c2ConnectToIA block
1004 — CVE list

FIG. 10

```
{
  "147.184.219.41": {
    "c2": [
      {
        "c2IP": "147.184.219.41",
        "c2Port": 8443,
        "c2Product": "Pupy",
        "country": "United States"
      }
    ],
    "colocated": [],
    "c2ConnectToIA": [],
    "iaConnectToC2": [
      {
        "iaIP": "70.66.75.50", }
    ],
    "c2ConnectToUnknownServer": [
      {
        "iaIP": "151.35.217.157",
        "iaPort": 57582,
        "iaProduct": "unknown",
        "iaVulns": [],
        "country": "US"
      }
    ],
    "unknownClientConnectToC2": [
      {
        "iaIP": "41.172.72.47",
        "iaPort": 0,
        "iaProduct": "unknown",
        "iaVulns": [],
        "country": "DE"
      },
      ...
      {
        "iaIP": "89.214.27.122",
        "iaPort": 0,
        "iaProduct": "unknown",
        "iaVulns": [],
        "country": "RU"
      }
    ],
    "c2ConnectToc2": []
  }
}
```

```
{
  "53.139.241.58": {
    "c2": [
      {
        "c2IP": "53.139.241.58",
        "c2Port": 9443,
        "c2Product": "Cobalt Strike",
        "country": "China"
      }
    ],
    "colocated": [],
    "c2ConnectToIA": [],
    "iaConnectToC2": [],
    "c2ConnectToUnknownServer": [
      {
        "iaIP": "188.199.88.48",
        "iaPort": 8089,
        "iaProduct": "unknown",
        "iaVulns": [],
        "country": "CN"
      }
    ],
    "unknownClientConnectToC2": [
      {
        "iaIP": "144.122.47.225",
        "iaPort": 0,
        "iaProduct": "unknown",
        "iaVulns": [],
        "country": "US"
      }
    ],
    "c2ConnectToc2": []
  }
}
```

FIG. 12

```
{
  "147.230.71.108": {
    "c2": [
      {
        "c2IP": "147.230.71.108",
        "c2Port": 443,
        "c2Product": "Cobalt Strike",
        "country": "Canada"
      },
      {
        "c2IP": "147.230.71.108",
        "c2Port": 80,
        "c2Product": "Cobalt Strike",
        "country": "Canada"
      }
    ],
    "colocated": [],
    "c2ConnectToIA": [],
    "iaConnectToC2": [],
    "c2ConnectToUnknownServer": [],
    "unknownClientConnectToC2": [
      {
        "iaIP": "211.102.40.218",
        "iaPort": 0,
        "iaProduct": "unknown",
        "iaVulns": [],
        "country": "US"
      },
      {
        "iaIP": "99.34.178.140",
        "iaPort": 0,
        "iaProduct": "unknown",
        "iaVulns": [],
        "country": "US"
      },
      ...
      {
        "iaIP": "81.76.51.176",
        "iaPort": 0,
        "iaProduct": "unknown",
        "iaVulns": [],
        "country": "NL"
      }
    ],
    "c2ConnectToc2": []
  }
}
```

VULNERABILITY DETECTION PLATFORM

CROSS REFERENCE TO OTHER APPLICATIONS

This application claims priority to U.S. Provisional Patent Application No. 63/647,534 entitled VULNERABILITY DETECTION PLATFORM filed May 14, 2024 which is incorporated herein by reference for all purposes.

BACKGROUND OF THE INVENTION

Nefarious entities are increasingly seeking out computing infrastructure to compromise. Once compromised, such entities can then mount attacks from or otherwise use such comprised servers in furtherance of illegal purposes. Unfortunately, preventing/mitigating such attacks can be very challenging. For example, the legitimate operator of a compromised system may be unaware that the system is vulnerable to attack and may further be unaware of any compromise subsequently taken. There therefore exists an ongoing need for improved techniques in protecting computing infrastructure from compromise/attacks.

BRIEF DESCRIPTION OF THE DRAWINGS

Various embodiments of the invention are disclosed in the following detailed description and the accompanying drawings.

FIG. 2A illustrates a portion of an example of an attacker infrastructure feed.

FIG. 2B illustrates a portion of an example of an attacker infrastructure feed.

FIG. 2C illustrates a portion of an example of an attacker infrastructure feed.

FIG. 3 illustrates a portion of an example of a potential victim feed.

FIG. 4A illustrates an example result.

FIG. 4B illustrates an example result.

FIG. 5A illustrates an example of a raw line provided by a NetFlow source.

FIG. 5B illustrates an example of information that can be stored by an attacker intelligence processor.

FIG. 6 illustrates an example of a portion of information that can be extracted out of a storage.

FIG. 7 illustrates a portion of a record corresponding to a target system.

FIG. 8 illustrates an example of a campaign.

FIG. 9 illustrates an example of a campaign.

FIG. 10 illustrates an example of a campaign.

FIG. 11 illustrates an example of a campaign.

FIG. 12 illustrates an example of a campaign.

FIG. 13 illustrates an example of a campaign.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
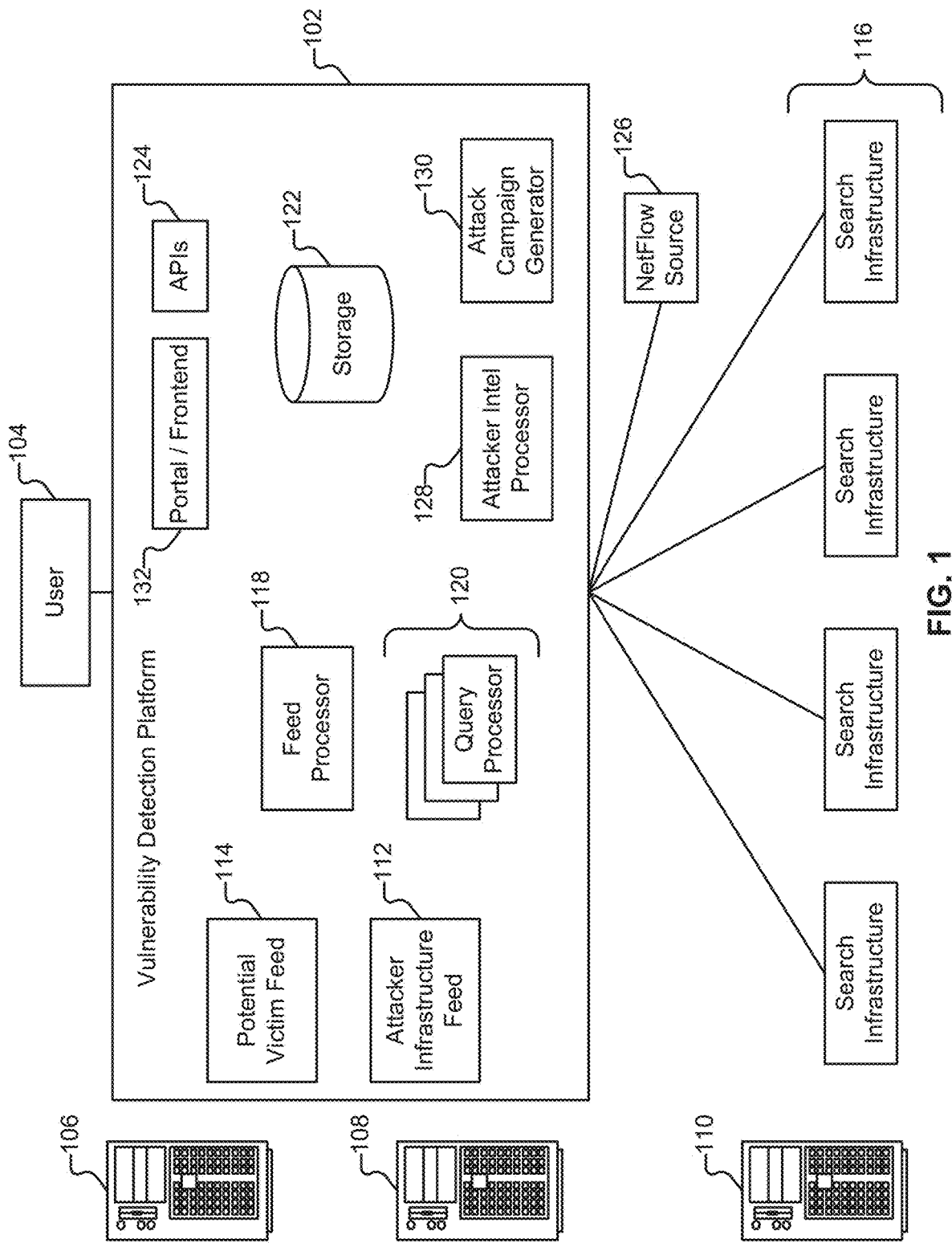
FIG. 1 illustrates an environment in which vulnerable infrastructure and
 attacking infrastructure can be identified and mitigated.

FIG. 1 illustrates an environment in which potentially vulnerable infrastructure and attacking infrastructure can be identified, and, as applicable, mitigated. A variety of types of users (collectively depicted as user 104 in FIG. 1) can make use of vulnerability detection platform 102. A first example of user 104 is an enterprise or other business entity (e.g., a bank) which maintains a set of infrastructure that provides internal (e.g., payroll, accounting, etc.) and/or external (e.g., customer facing) services. A second example of user 104 is a security company, which monitors infrastructure of its customers (e.g., as part of a security service subscription) and/or otherwise monitors infrastructure of others (e.g., to identify threats and publish alerts). Other interested entities, such as security researchers, governments, etc., can also use vulnerability detection platform 102 for various purposes.

Various types of servers are illustrated in FIG. 1. Server 106 is an example of an attack server (e.g., a command-and-control (C2) server). Server 108 is an example of a potentially vulnerable server. In undertaking attacks, an attacker may leverage additional infrastructure (e.g., proxy servers, redirectors, web shells, open directories containing malware, etc.) which, as discussed in more detail below, may in some cases may be an example of a vulnerable server that was previously compromised. As will also be described in more detail below, one use of vulnerability detection platform 102 is to identify nodes involved in malware campaigns (e.g., including attack servers, vulnerable servers, and other infrastructure).

In the example shown in FIG. 1, vulnerability detection platform 102 makes use of two feeds, which serve as templates for running queries. The first feed, attacker infrastructure feed 112, can be used to identify attack servers (e.g., server 106) and other attacker infrastructure (e.g., server 110) on the Internet. The second feed, potential victim feed 114, can be used to identify servers that are (or potentially are) vulnerable to various types of compromise (and similarly accessible on the Internet). Vulnerable and potentially vulnerable servers are generally referred to herein interchangeably (and are also generally interchangeably referred herein as victim/potential victim servers and target servers).

An example way of implementing both types of feeds is as a set of JSON files (e.g., stored in GitHub) that act as templates to indicate how various search infrastructure 116 can be queried to locate implicated servers (or other resources, as applicable, such as networking infrastructure). Examples of search infrastructure 116 include Censys, Google, Shodan, and Baidu. Other search infrastructure can also be used, as applicable. As an example, one or more scanners could be included within vulnerability detection platform 102 or otherwise in communication with vulnerability detection platform 102 (e.g., Nessus) to help identify nodes of interest. Different search tools operate differently, and particular infrastructure may be more efficient, yield better results, etc., over other tools, depending on the nature of the item being searched for. As an example, Baidu will likely result in better results for Chinese-related infrastructure and Google will be better at locating web shells.

FIG. 2A illustrates a portion of an example of attacker infrastructure feed 112. JSON for locating BlueShell and Metasploit c2 servers is shown. In particular, Shodan and Censys queries are included for locating instances of both attacks, as is metadata that can be included with results (e.g., identifying matching servers as being type "c2" (202) and providing a link to a description of the particular c2 (204)). FIG. 2B illustrates another portion of an example of feed 112. Depicted is JSON for locating an open directory using Google. FIG. 2C illustrates another portion of an example of feed 112. JSON for locating c99 and Gecko webshells, respectively, using Google, is shown.

FIG. 3 illustrates a portion of an example of feed 114, which can be used to locate potentially vulnerable hosts. Similar to attacker infrastructure feed 112, feed 114 includes various metadata that can be included with any results to queries. As new types of malicious servers and/or as new types of vulnerabilities are discovered, feeds 112/114 can be updated to include additional JSON for locating their instances. Further, while feeds 112/114 are depicted as being located within vulnerability detection platform 102, in various embodiments, such feeds or portions thereof are provided by one or more third parties (e.g., as part of a subscription service).

Vulnerability detection platform 102 includes a feed processor 118, which can run periodically (e.g., once a day), or on demand. Feed processor 118 orchestrates a set of query processors 120 performing searches of search infrastructure 116 using the definitions included in feeds 112/114. Different query processors can be tuned to search particular types of search infrastructure. For example, when feed processor 118 encounters an entry that includes a Shodan link, a task can be provided to a Shodan-savvy query processor (that is aware, e.g., of Shodan-specific API calls, rate limiting rules, etc., to efficiently obtain and process results). An example way of implementing feed processor 118 and query processors 120 is as a CI/CD pipeline (e.g., executing on AWS virtual private cloud infrastructure). In an example scenario, feeds 112/114 are validated (to make sure they are well-formed) and stored in AWS infrastructure. When triggered (e.g., based on a schedule or manually), work is spread out to query processors 120. Results obtained by query processors 120 will generally include IP address information, host information, port information, and particular information on where the identified infrastructure or vulnerability is located on the system.

An example result (e.g., returned by Shodan in response to a query sent by a query processor 120) is shown in FIG. 4A. An example result (e.g., returned by Google in response to a query sent by a query processor 120) is shown in FIG. 4B. Region 402 indicates the exact location of the exploit and region 404 indicates the identified type of exploit (i.e., the "c99" webshell). Region 406 indicates the identified hostname. As mentioned above, raw results returned by search infrastructure 116 can be annotated, for example, with metadata included in the applicable feeds. Normalization/standardization can also be performed, e.g., so that results use the same data structure for storage irrespective from which search infrastructure the results were obtained. Results are indexed/stored in storage 122, which is implemented in some embodiments using OpenSearch. Additional post-processing can also be performed. As an example, some search infrastructure may provide geolocation information (which may or may not be accurate), and other search infrastructure may not. In the example shown in FIG. 4A, the Shodan result includes ASN information and physical location information, while as shown in FIG. 4B, the Google result does not. ASN information, ASN names, and geographic information associated with IP addresses can be obtained (e.g., from a geolocation service) prior to insertion in OpenSearch. Some search infrastructure (e.g., Shodan and Censys) keep track of the last time they observed a given host live on the Internet and maintain information for a period of time (e.g., 30 days) before aging the information out. An example of a Shodan "last seen" is shown in region 410. Other search infrastructure (e.g., Google) may not, in which case its results can be enriched by vulnerability detection platform 102 inserting the last time the query was run by a query processor 120 (as shown at 408).

Vulnerability detection platform 102 includes a set of APIs 124 that can be used to perform various tasks. A first example API is one that can pull target/victim records from storage 122:

POST/v3/target/ip
Request Body: {"cidr": "<CIDR RANGE>"}
GET/v3/target/asn/{asn}
GET/v3/target/country/{cc}
POST/v3/target/match
Request Body: {"search": "<SEARCH STRING>"}

A second example API is one that can pull attacker infrastructure records from storage 122:

POST/v3/attacker/ip
Request Body: {"cidr": "<CIDR RANGE>"}
GET/v3/attacker/asn/{asn}
GET/v3/attacker/country/{cc}
POST/v3/attacker/match
Request Body: {"search": "<SEARCH STRING>"}

NetFlow is a network protocol for describing a communication between two IP addresses, using information such as source/destination IP and port information and how many packets/bytes were sent. The information is typically acquired at the ISP level and can be aggregated (e.g., by a NetFlow data provider)—generally with sampling (e.g., one out of every 30 k connections made) for efficiency.

In various embodiments, vulnerability detection platform 102 receives information from one or more NetFlow sources (collectively depicted as NetFlow source 126). Examples of such sources include NetFlow information directly collected by a component of vulnerability detection platform 102, NetFlow data obtained by a user 104 and provided to vulnerability detection platform 102 (e.g., via an API 124), and NetFlow data obtained from a third party source (e.g., via vulnerability detection platform 102 making use of an API). In an example implementation, once feed processor 118 completes orchestrating an attacker infrastructure feed processing job, attacker intel processor 128 is instructed to provide a list of attacker infrastructure IP addresses (e.g., extracted out of storage 122) to NetFlow source 126. Attacker intel processor 128 receives back NetFlow information (e.g., for the last seven days), which it indexes/stores in storage 122. An example of one raw line provided by NetFlow source 126 to vulnerability detection platform 102 is shown in FIG. 5A. An example of what could be stored in storage 122 by attacker intel processor 128 is shown in FIG. 5B. In particular, the information shown in FIGS. 5A/5B corresponds to a single c2 NetFlow entry. Of note, only a portion of the received raw information is ultimately stored in storage 122.

As shown in FIG. 5B, the NetFlow information received in 5A indicates a conversation between 34.144.84.151: 49304 (as the originator) and 139.138.255.141:9981. The protocol they spoke to each other is TCP (proto: 6) and the number of packets that were sent back and forth was 9362. In various embodiments, filtering is performed prior to (potential) insertion of a record into storage 122. One example includes filtering (not storing) NetFlow records for non TCP traffic (e.g., UDP). Another example includes filtering out low volume conversations (e.g., any records where "num_packets" is below a particular threshold value). The more packets involved in a given conversation, the more likely it is that a compromise has occurred/malicious behavior is occurring.

As shown in FIG. 5A, the NetFlow source included category information. This can be used to filter out SSH/HTTP/RDP scanners (e.g., infrastructure used by search infrastructure 116). It can also potentially be used to filter out traffic from scanners, depending on the quality of the category information. Other NetFlow sources may not contain such information, and if applicable, attacker intel processor 128 can obtain/apply blocklists of known scanner infrastructure to perform filtering.

FIG. 6 illustrates an example of a portion of information that can be extracted out of storage 122 after attacker intel processor 128 has completed processing described above. The first few lines of record 600 include information inserted by OpenSearch (e.g., including a globally unique identifier for the record, and the date the index was created). In this case, the record corresponds to attacker infrastructure, and in particular, a c2 server, and so there is no corresponding CVE.

FIG. 7 illustrates a portion of a record corresponding to a target system. Record 700 is similar to record 600, but, for example, this system is vulnerable to CVE-2023-23752 as indicated in region 702. A short description of that CVE is included in region 704, and indicates that the system is a vulnerable Joomla server. Systems often run multiple services, and if other services on the system are also vulnerable (e.g., to the same, or other CVEs), would be enumerated as well (e.g., in an array). Region 706 indicates additional information about the system-namely that it is potentially vulnerable (and that the type of attack is an "initial access" attack). In various embodiments, vulnerability detection platform 102 does not confirm whether or not a particular system is in fact vulnerable (e.g., because doing so without the permission of the system's owner could be legally problematic). In other embodiments, such confirmation is performed (e.g., by vulnerability detection platform 102 or another appropriate service). Accordingly, "potentially vulnerable" is generally used throughout the Specification to indicate that a system has been determined (e.g., by search infrastructure 116) to be subject to a vulnerability, but not confirmed as such.

Once the NetFlow data is collected/processed by attacker intel processor 128, feed processor 118 (or another appropriate mechanism) kicks off an attack campaign generation process and stores resulting campaigns in storage 122. An example of attack campaign generator 130 is a script (or set of scripts) authored in an appropriate language, such as python. In an example implementation, a campaign is centered around a single IP address (also used as a key when storing the campaign in storage 122) and includes under it any associated attack infrastructure (e.g., servers and other attack infrastructure) as well as any targets/victims. Attack campaign generator 130 pulls records from storage 122 (e.g., any records associated with a particular day's (or on demand job's) processing) and then cross correlates the information. An example process is as follows, with corresponding examples of each of six types of campaigns illustrated in FIGS. 8-13, respectively.

1. Generator 130 generates campaigns for attacker infrastructure that is cohosted with (collocated on) a target (potentially vulnerable) endpoint, as this suggests that a particular CVE may be being used to spread an attack (i.e., an attacker is co-opting victim resources as attack infrastructure). In the example shown in FIG. 8, generator 130 has determined that 57.250.37.136 (802) appears in storage 122 in both attacker records and victim/target records. In particular, the host (a Xiongmai Technology Co device) is both acting as a c2 server (on port 4949, running Spynote) and is vulnerable to CVE-2020-22253 (has port 9530 open).

Attacker IP addresses are looped through and additional campaigns are created (or existing campaigns are updated/enriched with additional information, as applicable) for any of the following:

2. Attacker hosts connecting to/communicating with other attacker hosts. In the example shown in FIG. 9, generator 130 has determined that 124.207.20.16 (902), which is running Cobalt Strike on both port 80 and 5555 (904), is in communication with another c2 server (906). One reason two attack servers might communicate is that one is being used as infrastructure for the other (e.g., a c2 server communicating with a responder server). By linking the two attack servers, their respective victims can also be linked, collectively, into a single campaign comprising all implicated nodes. The host 124.207.20.16 is also being connected to by two other, unknown, nodes (discussed in more detail below).

3. Attacker hosts connecting to/communicating with potentially vulnerable hosts. This could indicate an attack using a known CVE. In the example shown in FIG. 10, the server 129.199.36.184 is running Metasploit on port 3790. It is in communication with many different end hosts, as indicated under the "c2ConnectToIA" section (1002). As also indicated in that section, the implicated end hosts are running a variety of types of vulnerable software that are vulnerable to a variety of different CVEs (and, in some cases to multiple CVEs (1004)).

4. Potentially vulnerable hosts connecting to/communicating with attacker infrastructure. This could indicate that the vulnerable host is indeed compromised, e.g., by a reverse shell, second stage, exfiltration, or other victimology. In the example shown in FIG. 11, the server 147.184.219.41 is a Pupy c2 server running on port 8443. It has been contacted by target/victim server 70.66.75.50 which is vulnerable to CVE-2023-32315 (as indicated in region 1102). That a target system initiated contact with a known attack system is highly probative of the target system in fact having been compromised. The host 147.184.219.41 is also connecting to unknown servers and being connected to by unknown servers.

5. Attacker hosts connecting to/communicating with unknown hosts. The unknown hosts could potentially be either additional attack infrastructure or targets. In the example shown in FIG. 12, the server 53.139.241.58 has connected to an unknown server, 188.199.88.48:8089, which is located in China. No additional information (e.g., whether it is vulnerable to any exploits, what services it provides, etc.) is known. Server 53.139.241.58 is also being connected to by an unknown client.

6. Unknown hosts connecting to/communicating with attacker hosts. This could indicate a potential victim of an unknown CVE. In the example shown in FIG. 13, the Cobalt Strike server 147.230.71.108 has been connected to by several unknown clients (1302). As with the unknown hosts shown in FIG. 12, only the IP addresses and country information is known for the unknown hosts.

Figure 14:
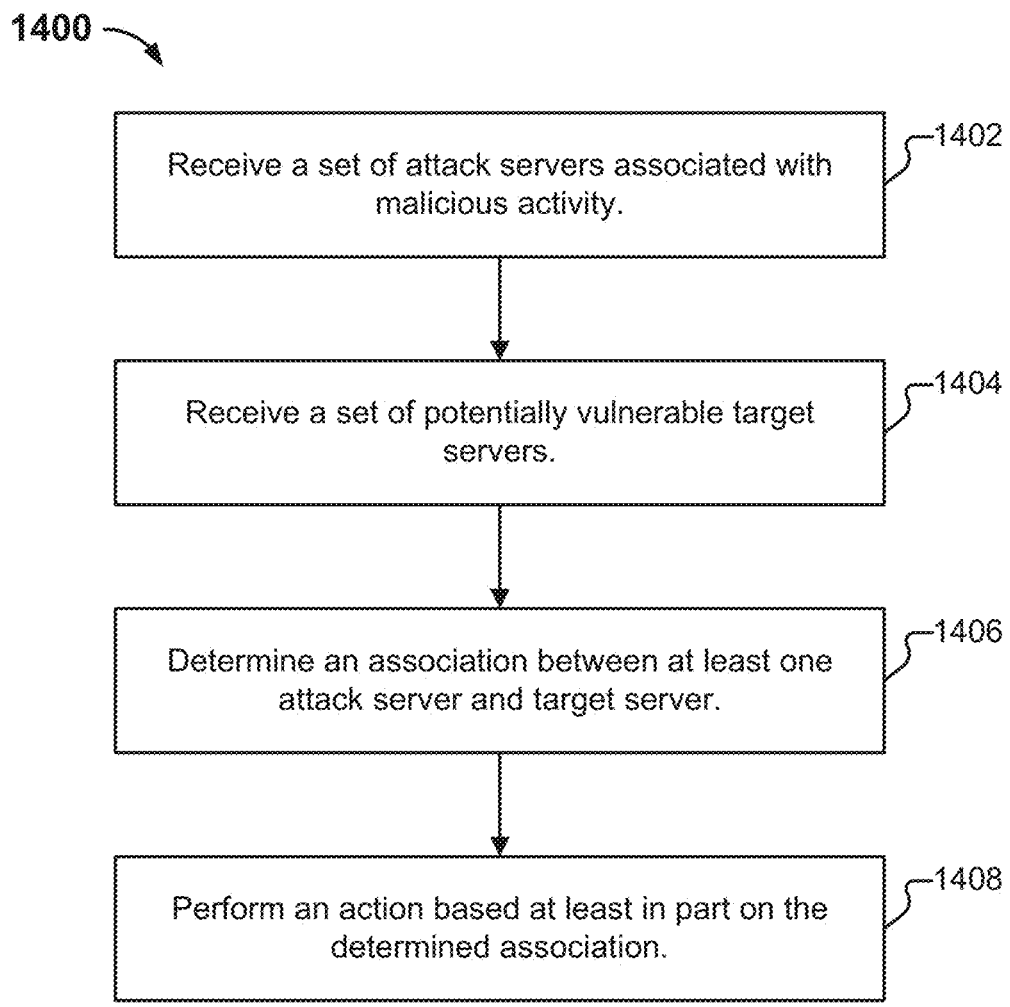
FIG. 14 is a flow diagram of an example process for detecting infrastructure associated with vulnerabilities in accordance with various embodiments.

FIG. 14 is a flow diagram of an example process for detecting infrastructure associated with vulnerabilities in accordance with various embodiments. In an example embodiment, process 1400 is performed by vulnerability detection platform 102. The process begins at 1402 when a set of attack servers associated with malicious activity is received. As one example, such a set is received in response to feed processor 118 orchestrating queries (e.g., periodically or on demand) of search infrastructure 116 using attacker infrastructure feed 112. At 1404, a set of potentially vulnerable target servers is received. As one example, such a set is received in response to feed processor 118 orchestrating queries (e.g., periodically or on demand) of search infrastructure 116 using potential victim feed 114.

At 1406, an association between at least one attack server in the set and one potentially vulnerable target server in the set is determined. In various embodiments, portion 1406 of process 1400 is performed by attack campaign generator 130. Examples of such determinations are variously provided above in connection with various campaigns. As an example, at 1406, a determination that 57.250.37.136 appears in both attacker records and victim/target records (and thus represents collocation) is illustrated in connection with FIG. 8. As another example, at 1406, a determination that potential victim server 70.66.75.50 has made a connection to known attack server 147.184.219.41 (and indicates that server 70.66.75.50 is in fact compromised) is illustrated in connection with FIG. 11.

Finally, at 1408, an action is performed based at least in part on the determined association. A variety of different actions can be taken. Vulnerability detection platform 102 includes, in various embodiments, a portal/frontend 132 that can be used to provide users 104 with the ability to perform searches, configure alerts, etc. One or more APIs 124 can also be used to provide such functionality to users 104. As a first example of processing that can be performed at 1408, suppose user 104 is an administrator of a corporate network for a bank. The user could use portal/frontend 132 (or API 124, as applicable) to provide vulnerability detection platform 102 with a list of assets (e.g., IP addresses of public facing bank infrastructure) for monitoring. If vulnerability detection platform 102 detects that any of the bank infrastructure is involved in a campaign (whether as an attacker or a victim), an alert can be generated and provided to user 104. Vulnerability detection platform 102 can also be configured to alert user 104 whenever any of the bank infrastructure is returned as a result by search infrastructure 116, even if not determined to be part of a campaign by attack campaign generator 130. As an example, an alert can be generated if any bank infrastructure is identified as an "unknown server" by vulnerability detection platform 102, or when search infrastructure 116 surfaces a bank server as potentially compromised (via potential victim feed processing) due to being vulnerable to a known CVE but not (yet) in communication with any attacker servers.

Another example of processing that can be performed at 1408 is for vulnerability detection platform 102 to store generated campaign information (or other information, as applicable) in storage 122 (e.g., using the IP address of the campaign as a key). Various queries can be performed (whether via portal/frontend 132 or an API 124) against storage 122. As an example, a security company can periodically search storage 122 for systems that match particular criteria, such as devices identified as being vulnerable to particular CVEs within a particular IP range, or devices that indicate collocation. In some cases, an attack server may already be known and blocked (e.g., by a security policy), but infrastructure the attack server uses (e.g., a redirector) may not have previously been known to be associated with that attack server. Using techniques described herein, the security company (or other entity, such as a registrar) can identify the redirector and add it to a block list (or take other appropriate action, as applicable).

Yet another example of processing that can be performed at 1408 is for vulnerability detection platform 102 to perform (or initiate) additional processing. For example, vulnerability detection platform 102 can perform statistical analysis (e.g., determining when particular campaigns were first seen, how many total machines are impacted by campaigns, how widespread a campaign is (e.g., across multiple victim networks, across countries, etc.), how many different campaigns a particular system is in, etc.). Vulnerability detection platform 102 can also investigate unknown servers, e.g., by adding them to a processing queue that scans (or provides to a third party service for scanning) for vulnerabilities, obtains geolocation information, etc. As applicable, unknown servers can be re-designated as victim or attacker servers (or both, in the case of collocation).

Whenever vulnerability detection platform 102 is described as performing a task, a single component, a subset of components, or multiple components of vulnerability detection platform 102 may cooperate to perform the task. Similarly, whenever a component of vulnerability detection platform 102 is described as performing a task, a subcomponent may perform the task and/or the component may perform the task in conjunction with one or more other components. Further, various implementations of vulnerability detection platform 102 can make use of different technologies (e.g., different scripting languages, different cloud computing platforms, etc.). In various embodiments, portions of vulnerability detection platform 102 are provided by one or more third parties. Depending on factors such as the amount of computing resources available to vulnerability detection platform 102, various logical components and/or features of vulnerability detection platform 102 may be omitted and techniques described herein adapted accordingly. Similarly, additional logical components/features can be included in embodiments of vulnerability detection platform 102 as applicable.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
   a processor configured to:
   receive a first set of attack servers associated with malicious activity;
   receive a second set of potentially vulnerable target servers;
   determine a connectivity association between at least one attack server included in the first set of attack servers and one potentially vulnerable target server included in the second set of potentially vulnerable target servers, wherein determining the connectivity association includes categorizing a node with which at least one of the at least one attack server and the one potentially vulnerable target server has communicated; and
   perform a remediation action, at least in part, based on the determined connectivity association; and
   a memory coupled to the processor and configured to provide the processor with instructions.

2. The system of claim 1, wherein receiving the first set of attack servers includes identifying a command and control (C2) server.

3. The system of claim 1, wherein receiving the first set of attack servers includes identifying attacker infrastructure.

4. The system of claim 1, wherein receiving the first set of attack servers includes receiving at least a portion of the set of attack servers from a third party service.

5. The system of claim 1, wherein receiving the first set of attack servers includes querying a repository of server information collected by a set of scanners.

6. The system of claim 1, wherein the second set of potentially vulnerable target servers includes a server known to be exploitable.

7. The system of claim 1, wherein receiving the second set of potentially vulnerable target servers includes querying a repository of server information collected by a set of scanners.

8. The system of claim 1, wherein the processor is configured to categorize the node at least in part by facilitating a scan of the node.

9. The system of claim 1, wherein the processor is further configured to confirm that the one potentially vulnerable target server is an actually vulnerable target server.

10. The system of claim 1, wherein determining the connectivity association includes determining that a first target server and a first attack server are collocated.

11. The system of claim 1, wherein the processor is further configured to determine that a first attack server is in communication with one or more additional attack servers.

12. The system of claim 1, wherein determining the connectivity association includes determining that a first attack server is in communication with one or more target servers.

13. The system of claim 1, wherein determining the connectivity association includes determining that a first target server is in communication with one or more attack servers.

14. The system of claim 1, wherein determining the connectivity association includes determining that a first attack server is in communication with an unknown server, wherein the unknown server is not included in either of the first set of attack servers or the second set of potentially vulnerable target servers.

15. The system of claim 1, wherein determining the connectivity association includes determining that an unknown server is in communication with an attack server, wherein the unknown server is not included in either of the first set of attack servers or the second set of potentially vulnerable target servers.

16. The system of claim 1, wherein the processor is further configured to use at least a portion of NetFlow information in determining the connectivity association.

17. The system of claim 16, wherein using the at least a portion of the NetFlow information includes filtering the NetFlow information based on protocol.

18. The system of claim 16, wherein using the at least a portion of the NetFlow information includes filtering the NetFlow information based on traffic volume.

19. The system of claim 1, wherein the processor is further configured to filter third party scanners from the first set of attack servers.

20. The system of claim 1, wherein performing the remediation action includes facilitating identification of an unknown server, wherein the unknown server is not included in either of the first set of attack servers or the second set of potentially vulnerable target servers.

21. A method, comprising:
   receiving a first set of attack servers associated with malicious activity;
   receiving a second set of potentially vulnerable target servers;
   determining a connectivity association between at least one attack server included in the first set of attack servers and one potentially vulnerable target server included in the second set of potentially vulnerable target servers, wherein determining the connectivity association includes categorizing a node with which at least one of the at least one attack server and the one potentially vulnerable target server has communicated; and
   performing a remediation action, at least in part, based on the determined connectivity association.

22. The method of claim 21, wherein receiving the first set of attack servers includes identifying a command and control (C2) server.

23. The method of claim 21, wherein receiving the first set of attack servers includes identifying attacker infrastructure.

24. The method of claim 21, wherein receiving the first set of attack servers includes receiving at least a portion of the set of attack servers from a third party service.

25. The method of claim 21, wherein receiving the first set of attack servers includes querying a repository of server information collected by a set of scanners.

26. The method of claim 21, wherein the second set of potentially vulnerable target servers includes a server known to be exploitable.

27. The method of claim 21, wherein receiving the second set of potentially vulnerable target servers includes querying a repository of server information collected by a set of scanners.

28. The method of claim 21, wherein categorizing the node includes facilitating a scan of the node.

29. The method of claim 21, further comprising confirming that the one potentially vulnerable target server is an actually vulnerable target server.

30. The method of claim 21, wherein determining the connectivity association includes determining that a first target server and a first attack server are collocated.

31. The method of claim 21, further comprising determining that a first attack server is in communication with one or more additional attack servers.

32. The method of claim 21, wherein determining the connectivity association includes determining that a first attack server is in communication with one or more target servers.

33. The method of claim 21, wherein determining the connectivity association includes determining that a first target server is in communication with one or more attack servers.

34. The method of claim 21, wherein determining the connectivity association includes determining that a first attack server is in communication with an unknown server, wherein the unknown server is not included in either of the first set of attack servers or the second set of potentially vulnerable target servers.

35. The method of claim 21, wherein determining the connectivity association includes determining that an unknown server is in communication with an attack server, wherein the unknown server is not included in either of the first set of attack servers or the second set of potentially vulnerable target servers.

36. The method of claim 21, further comprising using at least a portion of NetFlow information in determining the connectivity association.

37. The method of claim 36, wherein using the at least a portion of the NetFlow information includes filtering the NetFlow information based on protocol.

38. The method of claim 36, wherein using the at least a portion of the NetFlow information includes filtering the NetFlow information based on traffic volume.

39. The method of claim 21, further comprising filtering third party scanners from the first set of attack servers.

40. The method of claim 21, wherein performing the remediation action includes facilitating identification of an unknown server, wherein the unknown server is not included in either of the first set of attack servers or the second set of potentially vulnerable target servers.

41. A non-transitory computer-readable storage medium comprising computer instructions for:
  receiving a first set of attack servers associated with malicious activity;
  receiving a second set of potentially vulnerable target servers;
  determining a connectivity association between at least one attack server included in the first set of attack servers and one potentially vulnerable target server included in the second set of potentially vulnerable target servers, wherein determining the connectivity association includes categorizing a node with which at least one of the at least one attack server and the one potentially vulnerable target server has communicated; and
  performing a remediation action, at least in part, based on the determined connectivity association.

* * * * *

UNITED STATES PATENT AND TRADEMARK OFFICE
CERTIFICATE OF CORRECTION

PATENT NO. : 12,301,606 B1
APPLICATION NO. : 18/665845
DATED : May 13, 2025
INVENTOR(S) : Jacob Robert Baines, Michael Aaron King and Anthony John Bettini Page 1 of 1

It is certified that error appears in the above-identified patent and that said Letters Patent is hereby corrected as shown below:

In the Drawings

In sheet(s) 12 of 15, figure 11, delete ""iaIP": "70. 66. 75. 50"," and insert

```
        "iaIP": "70.66.75.50",
    "iaPort": 9091,
    "iaProduct": "Potentially Vulnerable: Openf
Webshell",
    "iaVulns": [
      "CVE-2023-32315"
    ],
    "country": "Russian Federation"
```
--, therefor.

Signed and Sealed this
Second Day of December, 2025

John A. Squires
*Director of the United States Patent and Trademark Office*